United States Patent [19]

Gaus

[11] 3,804,577
[45] Apr. 16, 1974

[54] APPARATUS FOR MAKING PLASTIC STOPS ON SLIDE FASTENER TAPE
[75] Inventor: Walter Gaus, Stuttgart, Germany
[73] Assignee: Dr.-Ing Josef Ruhrmann, Stuttgart, Germany
[22] Filed: May 8, 1972
[21] Appl. No.: 251,404

[30] Foreign Application Priority Data
May 13, 1971 Germany............................ 2123712

[52] U.S. Cl............... 425/510, 156/580, 425/122, 425/129, 425/174.2, 425/814, 425/520
[51] Int. Cl...................... A61k 17/00, A44b 19/42
[58] Field of Search....... 156/73, 580, 521, 66, 293, 156/303.1; 264/23, 266, 273; 425/109, 122, 129, 174.2, 814

[56] References Cited
UNITED STATES PATENTS
3,671,366 6/1972 Miller................................ 156/580
3,510,379 5/1970 Heimberger......................... 156/66
2,824,595 2/1958 Lehre.................................. 156/66
3,367,809 2/1968 Soloff.................................. 156/73
3,386,870 6/1968 Morin................................ 156/580

Primary Examiner—Douglas J. Drummond

[57] ABSTRACT

Top stops are made on slide fastener tape either before or after attaching the locking elements by clamping the tape between a titanium die and an anvil formed with recesses which jointly constitute a shaping cavity, a blank of thermoplastic synthetic resin composition being automatically cut from a bar and fed to the recess in the anvil prior to clamping, and being fused in the cavity by a pulse of ultrasonic energy transmitted from the die. The fused resin composition passes through the fabric of the tape to form a boss on both faces of the tape.

6 Claims, 1 Drawing Figure

PATENTED APR 16 1974   3,804,577
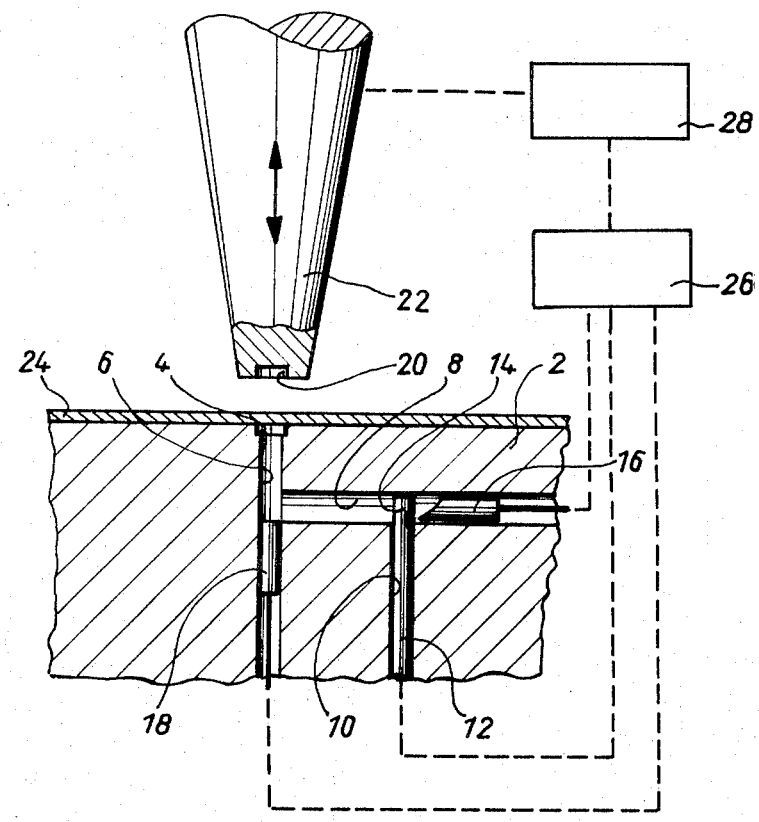

APPARATUS FOR MAKING PLASTIC STOPS ON SLIDE FASTENER TAPE

This invention relates to apparatus for attaching a boss to a piece of fabric, and particularly to apparatus for applying top stops and like devices for limiting the stroke of a slide fastener slider to fabric tape and like supporting fabric before or after the locking elements of the slide fastener are attached to the fabric.

Stops were provided heretofore in slide fasteners having thermoplastic locking elements by deforming the terminal elements of a fastener under heat and pressure, and by welding additional thermoplastic material to the deformed elements. This procedure is relatively complex and time consuming. Also, it involves the shaping of interlocking elements which are then subjected to a secondary treatment destroying the initial shape, an inherent waste of effort.

It is the primary object of this invention to provide apparatus for firmly attaching a thermoplastic boss to a piece of fabric, such as slide fastener tape, at any desired location, and thereby to provide top stops or bottom stops either before or after installation of the interlocking elements, and without utilizing the material of the elements.

According to the invention, a solid body having a face adapted to support the slide fastener tape, and hereinafter referred to as an anvil, is formed with a recess in its supporting face. A feeding mechanism feeds a blank of thermoplastic synthetic resin composition to the recess. A die is moved by an operating mechanism transversely to the supporting face of the anvil toward and away from a position in which the die is superposed on the recess and on the slide fastener tape when the latter covers the recess. Arrangements are made for heating energy to be transmitted from the die to the blank in the operating position of the die when the blank is received in the recess of the anvil.

Other features, additional objects, and many of the attendant advantages of this invention will readily become apparent from the following detailed description of a preferred embodiment when considered in connection with the appended drawing in which the sole FIGURE illustrates apparatus of the invention in elevational section, and partly in a diagrammatic manner.

A metal block 2 provides an anvil having a flat, horizontal top face formed with a recess 4 in the shape of a short cylinder whose axis is upright. The recess 4 is the enlarged terminal portion of an upright feeding conduit 6 in the anvil 2. A horizontal connecting conduit 8 leads into the feeding conduit 6 below the recess 4, and is itself intersected by a vertical supply conduit 10.

A bar 12 of thermoplastic synthetic resin composition, such as nylon, is slidably received in the supply conduit 10. In the illustrated position of the bar 12, its top terminal portion 14 projects into the connecting conduit 8 and into the path of a transfer pusher 16. The transfer pusher 16 tapers at its front end toward the bar 12 to a knife edge located to sever the portion 14 from the remainder of the bar 12 when the pusher 16 moves in the connecting conduit 8 toward the feeding conduit 6, thereby transferring the plastic blank constituted by the severed bar section 14 to the feeding conduit 6.

Another pusher 18 is located in the feeding conduit 6 below the orifice of the connecting conduit 8 in the illustrated condition of the apparatus, and feeds the blank 14 to the recess 4 when the pusher 18 is moved upward from its illustrated position.

A recess 20 is vertically aligned in a die 22 with the recess 4 and is approximately equal in shape and size with the aligned recess in the anvil 2. The die 22 is a frustoconical piece of titanium metal, the recess 20 being formed in the smaller base of the frustum. A piece of slide fastener tape 24, elongated in the plane of the drawing, is placed on the horizontal supporting face of the anvil 2 and upwardly covers the recess 4.

A common motor drive 26 is connected by non-illustrated cams, cam followers, and linkages with the pushers 16, 18, a non-illustrated pusher which backs the plastic bar 12, and with a reciprocating mechanism, not shown, which moves the die 22 as indicated by a double arrow in a timed sequence which will presently be described. An ultrasonic generator 28 is coupled to the die 22 in a conventional manner, not shown, by a transducer to produce ultrasonic vibrations of the die at a time set by a timing switch coupled with the drive 26. When the motor of the drive 26 is energized by an operator after placing the tape 24 on the anvil 2, the synchronous drive mechanism causes the device to operate in the following cycle:

The plastic bar 12 is raised into the position shown in the drawing. The pusher 16 is moved toward the feeding conduit 6, thereby severing the blank 14 from the remainder of the bar 12, and transferring the blank into the feeding conduit. The pusher 18 is raised until its leading face forms the bottom of the recess 4. The die 22 is lowered, and the associated transducer is simultaneously energized. The ultrasonic energy radiated from the narrow end of the die 22 softens the blank 14 in the recess 4, and the pressure of the die against the tape 24 causes the softened or liquefied plastic to penetrate the fabric and to fill the sealed shaping cavity formed by the recesses 4, 20 when the die 22 descends to its operative position. The generator 28 is disconnected from the die 22, and the high heat conductivity of the latter permits quick solidification of the plastic boss projecting from both faces of the tape 24. The anvil 2 acts as a heat sink for the same purpose. When the shaped plastic boss is solidified, the die 22 is withdrawn, and a new cycle may begin.

When a row of locking slide fastener elements is attached to the tape 24 parallel to the plane of the drawing and terminating at the boss, the latter may provide a top stop or a bottom stop to limit the stroke of a slider arranged on the elements. If so desired, the boss may be formed on the tape 24 after the locking elements are mounted on the same, and the die may be modified, if necessary, to prevent undesired thermal effects on the slide fastener elements during the shaping of a stop in the cavity formed by the recesses 4, 20. Obviously, bosses serving as slide fastener stops may also be formed on the edge portion of a garment if a separate supporting tape for the slide fastener elements is not employed.

Polyamide (nylon) is the preferred material of the plastic bar 12 because of its relatively narrow melting range, but other thermoplastic materials may be chosen, particularly when it is desired to attach bosses as stops to a stringer carrying nylon locking elements, and the apparatus illustrated may be employed without modification if the material of the blank 14 has a much lower melting point than the nylon of the locking elements.

The operation of the apparatus, as described above, calls for an operator to place a piece of fabric 24 on the anvil 2 and to initiate a cycle of operation. Obviously, the synchronous drive 26 may feed the tape 24 in suitable steps over the supporting face of the anvil 2 and automatically initiate the boss-forming cycle as soon as a tape-feeding step is completed.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. Apparatus for attaching a boss to a piece of fabric comprising, in combination:
   a. a solid body having a face adapted to support said piece and formed with a recess in said face thereof;
   b. feeding means for feeding a blank of thermoplastic synthetic resin composition to said recess, said feeding means including
      1. severing means for severing said blank from a larger body of said composition, the volume of said blank being substantially equal to the capacity of said cavity,
      2. a feeding conduit leading into said recess,
      3. admitting means for admitting said severed blank to said conduit, and
      4. pusher means in said conduit for pushing the admitted blank into said recess,
         (i) said admitting means including another conduit connecting said severing means to said feeding conduit, and transferring means for transferring the severed blank through said connecting conduit to said feeding conduit;
   c. a die formed with a recess opposite the recess in said face, said recesses jointly constituting a shaping cavity adapted to receive a portion of said piece in said position of said die;
   d. operating means for moving said die transversely of said face toward and away from a position in which said die is superposed on said recess and on said piece when the latter covers said recess; and
   e. heating means for transmitting heating energy to said blank from said die in said position of the die, when said blank is received in said recess.

2. Apparatus as set forth in claim 1, wherein said feeding means further include a supply conduit intersecting said connecting conduit, supply means for moving a bar of said composition through said supply conduit into a position in which a terminal part of said bar is received in said connecting conduit, said transferring means including a pusher member movable in said connecting conduit, and said severing means including a cutting edge on said pusher member.

3. Apparatus as set forth in claim 2, further comprising drive means for driving said operating means, said pusher means, and said pusher member in timed sequence.

4. Apparatus as set forth in claim 1, wherein said heating means include a source of ultrasonic energy operatively connected to said die.

5. Apparatus as set forth in claim 1, wherein said die tapers in a direction toward said face.

6. Apparatus as set forth in claim 5, wherein said die essentially consists of titanium metal.

* * * * *